T. HOLMES.
TURBINE WATER-WHEEL.

No. 177,123. Patented May 9, 1876.

Witnesses:
Chas. O. Gill
R. Goodridge

Inventor:
Thomas Holmes
by his Attys.
Cox & Cox.

N. PETERS, PHOTO-LITHOGRAPHER, WASHINGTON, D.C.

UNITED STATES PATENT OFFICE.

THOMAS HOLMES, OF MANSFIELD, OHIO.

IMPROVEMENT IN TURBINE WATER-WHEELS.

Specification forming part of Letters Patent No. 177,123, dated May 9, 1876; application filed February 12, 1876.

*To all whom it may concern:*

Be it known that I, THOMAS HOLMES, of Mansfield, Richland county, Ohio, have invented certain new and useful Improvements in Turbine Water-Wheels, of which the following is a specification, reference being had to the accompanying drawings.

This invention relates to an improvement in turbine-wheels; and consists of two turbine-wheels, each provided with a spur-gear wheel at the upper end of its shaft, in combination with a driving-shaft provided with a spur-gear wheel, the teeth of which mesh with the teeth of the spur-gear wheels upon the shafts of the turbine-wheels, the object being to give increased velocity and power to the driving-shaft.

Figure 1:
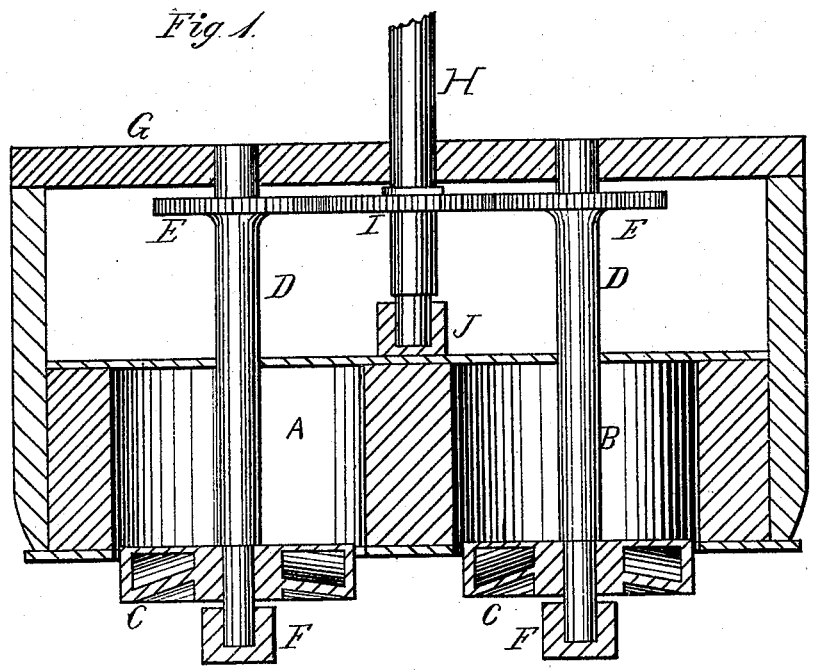
Figure 2:
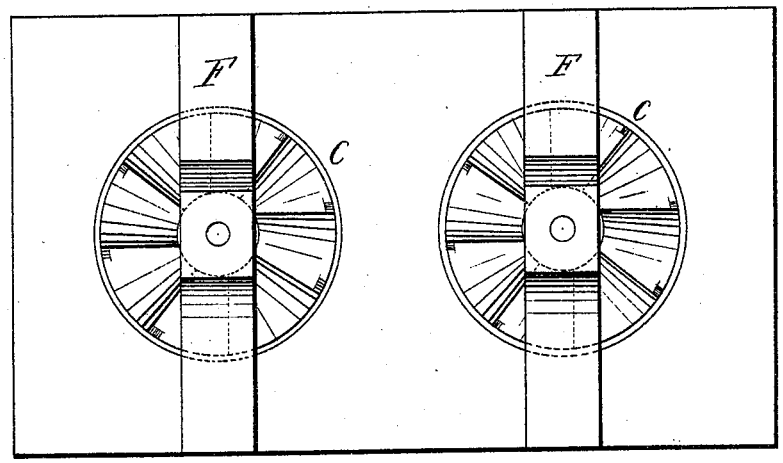

Figure 1 is a central vertical longitudinal section of a device embodying the elements of the invention. Fig. 2 is a bottom view of same.

In the accompanying drawings, a double inner flume or two inner flumes, A B, are constructed, and each provided with a horizontal outward-flow turbine-wheel, C, the shafts D of which are provided with spur-gear wheels E. The lower ends of the shafts D are each stepped in a sill, F. The upper ends have their bearings in a beam, G. The driving-shaft H is provided with a spur-gear wheel, I, the teeth of which mesh with the teeth of both the wheels E E, the wheel I being placed directly between the two wheels E. The driving-shaft H has its lowest bearing in a step in the sill J upon the cover of the flumes A B. It also has an intermediate bearing in the beam G. The bottom of the flumes A B consists of two plates, *a*, provided with suitable apertures to fit closely about the peripheries of the wheels D, and is made in two parts, so as to be brought together as the parts adjacent the wheel become worn, thus affording a constant retention of the water within the flumes, save where it escapes through the wheels.

The operation of the invention is as follows: The water rushes through two outer flumes into the inner flumes, A B, and gives motion to the turbine-wheels C, which motion is communicated through the spur-gear wheels E to the spur-gear wheel I and to the driving-shaft, thus giving increased power and velocity to the driving-shaft.

I am aware that turbine water-wheels driven by gear attachments have long been known; but in those heretofore used motion is communicated to the driving-shaft by passing it from one gear to another until it reaches the wheel immediately connected with said shaft. Thus the wheels are partially inoperative, the power being lost to a very great extent, it taking more water to run wheels geared in such manner, and when the water is low they will not operate at all. It is obvious that the above construction is very defective, and I lay no claim to such device; but What I do claim as my invention, and desire to secure by Letters Patent, is—

The turbine water-wheels C, provided with their respective shafts D, and gear-wheels E, in combination with the gear-wheel I and driving-shaft H, when the shafts of the turbine-wheels are arranged in the same plane as the central plane of the driving-shaft, substantially set forth.

In testimony that I claim the foregoing improvements in turbine water-wheels, as above described, I have hereunto set my hand and seal this 27th day of January, 1876.

THOMAS HOLMES. [L. S.]

Witnesses:
T. E. BURROWS,
R. B. McCRARY.